United States Patent
Haglund et al.

(10) Patent No.: US 11,257,185 B2
(45) Date of Patent: Feb. 22, 2022

(54) RESOLUTION ENHANCEMENT OF AERIAL IMAGES OR SATELLITE IMAGES

(71) Applicant: Maxar International Sweden AB, Linkoeping (SE)

(72) Inventors: Leif Haglund, Brokind (SE); Gustav Tapper, Linkoeping (SE); Anna Birgersson, Linkoeping (SE); Klara Hellgren, Bromma (SE)

(73) Assignee: Maxar International Sweden AB, Linkoeping (SE)

( * ) Notice: Subject to any disclaimer, the term of this patent is extended or adjusted under 35 U.S.C. 154(b) by 96 days.

(21) Appl. No.: 16/704,892

(22) Filed: Dec. 5, 2019

(65) Prior Publication Data
US 2021/0082093 A1  Mar. 18, 2021

(30) Foreign Application Priority Data
Sep. 17, 2019 (EP) .................... 19197717

(51) Int. Cl.
*G06T 3/40* (2006.01)
*G06N 3/08* (2006.01)

(52) U.S. Cl.
CPC ............ *G06T 3/4046* (2013.01); *G06N 3/088* (2013.01); *G06T 2207/10032* (2013.01); *G06T 2207/20081* (2013.01); *G06T 2207/20084* (2013.01)

(58) Field of Classification Search
CPC ......... G06T 3/4046; G06T 2207/20084; G06T 2207/10032; G06T 2207/20081; G06N 3/088
See application file for complete search history.

(56) References Cited

U.S. PATENT DOCUMENTS
2020/0125822 A1* 4/2020 Yang .................. G06N 7/023

FOREIGN PATENT DOCUMENTS
CN  109035142 A  * 12/2018
KR  102188035 B1 * 12/2020
WO  WO-2014/112911 A1  7/2014

OTHER PUBLICATIONS

European Patent Office, Extended European Search Report for European Patent Application No. 19197717.2, dated Nov. 7, 2019, (11 pages), Stockholm, Sweden.
Ma, Jianglin et al. *An Operational Superresolution Approach For Multi-Temporal and Multi-Angle Remotely Sensed Imagery*, IEEE Journal of Selected Topics in Applied Earth Observations and Remote Sensing, vol. 5, No. 1, Feb. 2012, pp. 110-124.
(Continued)

*Primary Examiner* — Siamak Harandi
(74) *Attorney, Agent, or Firm* — Alston & Bird LLP

(57) ABSTRACT

A method for resolution enhancement of images is described comprising the steps of providing (101) at least a first two dimensional (2D) test image, providing (102) a high-resolution 3D map, providing (103) a Machine Learning Network (MLN), extracting (104), from the high-resolution 3D map, a 2D submap, comprising geocoded 2D coordinate data and texture information, extracting (105) a 2D subimage from the 2D test image, which 2D subimage is an image of the same area as the 2D submap, and training the MLN, using the high-resolution 2D submap and the 2D subimage.

12 Claims, 4 Drawing Sheets

(56) References Cited

OTHER PUBLICATIONS

Giuseppe, Masi et al. *CNN-Based Pansharpening of Multi-Resolution Remote-Sensing Images*, Joint Urban Remote Sensing Event (JURSE), ieee, Mar. 6, 2017, (4 pages), XP033095027.
Collins, Charles B. et al. *Deep Learning For Multisensor Image Resolution Enhancement*, Proceedings of the $1^{st}$ Workshop on Artificial Intelligence and Deep Learning For Geographic knowledge Discovery, Nov. 7, 2017, pp. 37-44, XP055489254.

* cited by examiner

RESOLUTION ENHANCEMENT OF AERIAL IMAGES OR SATELLITE IMAGES

CROSS REFERENCE TO RELATED APPLICATIONS

This application claims priority to and benefit of European Patent Application No. 19197717.2, as filed on Sep. 17, 2019; the contents of which as are hereby incorporated by reference in their entirety.

BACKGROUND

Related Field

The present invention relates to a method and arrangement for resolution enhancement of aerial images or satellite images.

Description of Related Art

A fast growing market both in civilian and military business is geographical information systems. Knowledge about geographical conditions forms a fundamental decision support to companies, authorities and in the military. The geographical information can comprise digital maps having superposed information layers such as infrastructure, terrain type and different types of objects. This way of providing digital maps comprises forming two dimensional maps comprising capturing images of the terrain from an aircraft and post-processing of the captured images. It is possible to form three dimensional maps from captured images or range data sets of the terrain/infrastructure.

In order to achieve an efficient capturing of images of the ground it is advantageous to use satellite images as satellites may capture images covering a large area in a short time. A drawback with satellite images is that they have lower resolution than aerial images taken from, e.g., an aeroplane. It is however very time consuming and sometimes impossible to capture aerial images covering large areas, one reason being that the ground areas to be captured on images are in a country not allowing aerial image capturing.

In some instances images of the ground may have been captured with cameras not specifically optimized for capturing images of the ground. It is desirable to be able to enhance the resolution also in such images.

Charles B. Collins et al: "Deep learning for multisensor image resolution enhancement", Proceedings of the 1$^{st}$ Workshop on Artificial Intelligence and Deep Learning for Geographic Knowledge Discovery, 1 Jan. 2017, pages 37-44, XP055489254, New York, USA, describes a method for resolution enhancement of aerial images or satellite images.

BRIEF SUMMARY

An objective of the present invention is to provide a method, a system and a computer program, which enables more efficient formation of high resolution 3D maps of large areas, than has been possible according to the prior art.

Another exemplary objective of the present invention is to provide a method a system and a computer program, which enables resolution enhancement of aerial images or satellite images.

At least one of these objects is fulfilled with a method, a system and a computer program according to the independent claims. Further exemplary advantages are achieved with the features of the dependent claims.

According to a first aspect of the present invention a method is provided for resolution enhancement of aerial images or satellite images. The method comprises the steps of providing at least a first two dimensional (2D) training image comprising an image of a first area on ground, wherein the 2D subimage has been captured at a first angle (a) towards the ground and at a first height above the ground, and providing a Machine Learning Network (MLN). The method is characterized in that the method further comprises the steps of providing a high-resolution three dimensional (3D) map, wherein the high-resolution 3D map covers a second area which at least is a part of the first area, and wherein the high-resolution 3D map has a higher resolution than the 2D training image, and extracting, from the high-resolution 3D map, in a second angle towards the ground and at a second height above the ground, a 2 dimensional (2D) submap, representing a third area which is at least a part of the second area, and comprising geocoded 2D coordinate data and texture information, wherein the second angle differs no more than 5° from the first angle and wherein the second height differs no more than 5% from the first height. The method is also characterized by the steps of extracting a 2D subimage from the 2D training image, which 2D subimage is an image of the third area, and training the MLN, using the high-resolution 2D submap and the 2D subimage.

Imagery using aerial or satellite images is often referred to as air or space born imagery.

The described method for resolution enhancement of images is favourable in that it facilitates the training of the MLN for the resolution enhancement. By providing a high resolution 3D map with higher resolution than the 2D training image, it is possible to extract a 2D submap of the ground from the same angle and same height as the 2D image. The 2D subimage extracted from the 2D training image will thus be a representation of the ground from the same angle and the same height as the 2D submap. By having such a perfect match between the 2D subimage and the 2D subimage the training of the MLN becomes better than if there is an angle difference and/or a height difference between the 2D subimage and the 2D submap. Such an angle difference and/or height difference would occur if a high resolution 2D map would be used as it then would not be possible to change the angle or height of the 2D submap.

The method according to the invention is especially advantageous in the enhancement of satellite images. Thus, the method according to the invention is especially for resolution enhancement of satellite images.

By the use of a 2D subimage extracted from a 2D satellite image in the training of the MLN the MLN is trained to take into account different factors that have an effect on the image and that are specific for satellite images. Examples on such factors are the influence of the atmosphere on the satellite image, and the colour balance, which is different in satellite images than in images captured from an aircraft.

Furthermore, satellite images are usually compressed when provided from service providers. The compression of the satellite images results in compression errors. By using a 2D subimage extracted from the 2D training image in the training of the MLN, the MLN is trained to take into account such compression errors. When the trained MLN is later used to enhance the resolution of satellite images they have been trained to take care of some of the compression errors.

An alternative to the described method of using 2D images and a 3D map to train the MLN would be to generate, based on an aerial image, a fake image with a deteriorated resolution. The training of an MLN with an aerial image and such a fake image would result in a MLN trained to improve fake images but not especially trained to improve real aerial images or real satellite images.

Apart from being taken from the same angle the 2D subimage and the 2D submap should be taken from the same angle the pixels of the 2D subimage should also have a correspondence in the 2D submap. The 2D subimage and the 2D submap could have the same number of pixels such as, e.g., 1000×1000 pixels. It would also be possible to have a higher resolution in the 2D submap as long as the pixels of the 2D subimage have corresponding pixels in the 2D submap. The 2D submap may for example have a resolution of 2000×2000 pixels while the 2D subimage has a resolution of 1000×1000 pixels. 2×2 pixels in the 2D submap then has a clear correspondence in 1×1 pixel in the 2D subimage.

Even if it is desirable that the 2D subimage and the 2D submap have been captured in essentially the same angle to the ground it is possible to have a small difference between their angles. The first 2D subimage may have been captured at a first angle towards the ground, wherein the 2D submap has been extracted in a second angle towards the ground. The second angle differs no more than 1° from the first angle. Most preferred is that the first angle is essentially the same as the second angle.

Even if it is desirable that the 2D subimage and the 2D submap have been captured at essentially the same height it is possible to have a small difference between the heights at which they have been captured. The 2D subimage may have been captured at a first height above the ground 1, and the 2D submap may have been extracted at a second height above the ground. The second height differs no more than 1% from the first height.

By capturing the 2D subimage and the 2D submap at the same height and at the same angle to the ground the perspectives become the same in the 2D subimage and the 2D submap.

The method may comprise the steps of providing at least one 2D test image comprising an image of an area on ground, and generating, from the at least one 2D test image, using the trained MLN, a synthetic 2D image, wherein the synthetic 2D image has an enhanced resolution in relation to said at least one 2D test image. The generation of the synthetic 2D image may be performed by a different entity than the one training the MLN. The method thus provides a favourable way of providing an enhanced resolution of the 2D images.

At least two different 2D test images may be provided, wherein each one of the 2D test images comprises an image of the same area on ground, wherein the 2D test images are taken from at least two different angles towards the ground, and wherein a respective synthetic 2D image is generated from each one of the 2D test images using the trained MLN. By providing a synthetic 2D image from each one of the 2D test images it is possible to generate a 3D map with enhanced resolution.

The high-resolution 3D map may comprise geocoded 3D coordinate data and texture information. This makes it possible to generate synthetic 2D images with enhanced resolution both in respect of the coordinate data and in respect of the texture information.

The generation of a 3D map from 2D images is known from the prior art and is described in, e.g., WO2014/112911. The method described in said publication comprises the steps of providing a plurality of overlapping images of the environment, each image being associated to navigation data; providing distance information, said distance information comprising a distance value and navigation data from a plurality of distance measurements; and developing the 3D model based on the plurality of overlapping images and the distance information. The step of developing the 3D model comprises the steps of providing the 3D model based on the plurality of overlapping images and updating the 3D model with the distance information using an iterative process.

Thus, each one of the 2D images are preferably associated to navigation data and distance information comprising a distance value and navigation data from a plurality of distance measurements. The step of developing the synthetic 3D map comprises the steps of providing the synthetic 3D map based on the plurality of overlapping images and updating the 3D map with the distance information using an iterative process. There are a few different ways of representing the synthetic 3D map. The synthetic 3D map may be represented as a mesh, as a surface representation, or as a voxel representation.

Each one of the 2D test images may be associated with navigation data and distance information. The method may thus comprise the step of generating from the synthetic 2D images, using the navigation data and the distance information, a synthetic 3D map comprising coordinate data and texture information. There are two main possibilities for the creation of the synthetic 3D map. According to a first alternative the coordinate information could be taken solely from the 2D test images while the texture information can be taken from the synthetic 2D images. Thus, the method may comprise the steps of generating from the 2D test images a 3D map comprising geocoded 3D coordinate data, and enhancing, using the synthetic 2D images, the texture information in the synthetic 3D map.

Alternatively, the coordinate information as well as the texture information may be taken from the synthetic 2D images.

The high-resolution 3D map are preferably based on aerial images. It is, however, possible to base the high-resolution 3D map on images captured from tall buildings, masts or towers.

The Machine Learning Algorithm may be chosen from a Generative Adversarial Network (GAN), a Fully Connected Network (FCN) and a Convolutional Neural Network (CNN). Different variants of GANs exist, such as, e.g., Super Resolution GANs (SRGAN) Wasserstein GANs (WGAN), and Self-Attention GANs (SAGAN).

If the MLN is a GAN it may comprise a first multilayer perceptron constituting a generator, and a second multilayer perceptron constituting a discriminator.

According to a second aspect of the present invention a system is provided for resolution enhancement of images, which system is implemented on a server device and is arranged to perform the method according to the first aspect or any of its preferred embodiments described above.

The advantages of such a system are the same as those described in relation to the first aspect of the invention.

According to a third aspect of the present invention a computer program for resolution enhancement of images is provided, comprising instructions which, when executed by at least one processor cause the at least one processor to carry out the method according to the first aspect or any of the preferred embodiments of the first aspect.

BRIEF DESCRIPTION OF THE FIGURES

In the following description of preferred embodiments, reference will be made to the attached drawings, which are not drawn to scale and in which.

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Still further, to facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

In the different embodiments described below the images of which the resolution is to be enhanced are exemplified as satellite images. It would, however, be possible to enhance the resolution also of aerial images.

Figure 1:
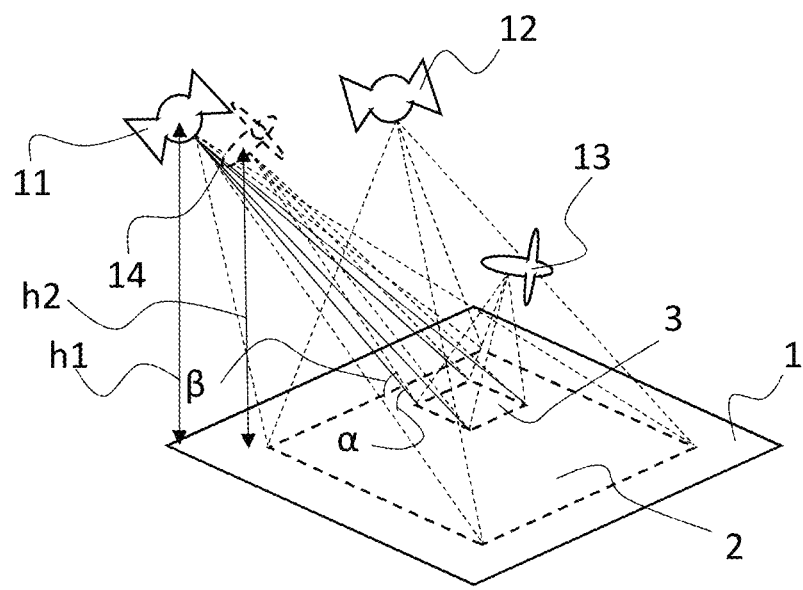
FIG. 1 shows schematically the capture of images of an area on the ground using a satellite and an aircraft.

FIG. 1 shows schematically the capture of images of an area on the ground 1 using a first satellite 10, a second satellite 11, and an aircraft 12. As us shown in FIG. 1 the first satellite 10 captures a first two dimensional (2D) satellite image of a first area 2 from a first angle and the second satellite 11 captures a second two dimensional (2D) satellite image of the first area 2 from a second angle. Also shown in FIG. 1 is an aircraft, which captures an image of a second area 3 from a third angle. In FIG. 1 the second area 3 is entirely within the first area 2, i.e., there is no part of the second area 3 outside of the first area 2. Due to the smaller distance between the aircraft and the ground 1 compared to the distance between the satellites 11, 12, and the ground 1, it is possible to achieve a higher resolution on the images captured from the aircraft 13 than on the images captured from the satellites. The high-resolution 3D map has a higher resolution than the 2D satellite image.

Images have been captured of the second area by the aircraft 13 from at least two different angles, of which only one is shown in FIG. 1. Based on said images a high-resolution three dimensional (3D) map of the second area 3 may be created. From the high-resolution 3D map it is possible to extract a 2 dimensional (2D) submap, representing a third area which is at least a part of the second area. In FIG. 1 the 2D submap represents the entire second area and comprises geocoded 2D coordinate data and texture information. A 2D subimage is extracted from the 2D satellite training image, which 2D subimage is an image of the third area, which in this case corresponds to the second area 3. The 2D subimage has been taken at a first angle α to the ground as indicated with the solid lines from the satellite 11 to the ground. The 2D subimage has been captured at a first height h1 above the ground 1. The 2D submap is extracted at a second angle β to the ground and at a second height h2 above the ground. The second angle β differs no more than 5°, preferably no more than 1° from the first angle α. The second height h2 differs no more than 5%, preferably no more than 1% from the first height h1. By having 2D submap and the 2D subimage captured at essentially the same height and the same angle to the ground the perspective becomes the same.

The 2D submap is thus a synthetic image which has been extracted from the high-resolution 3D map. The 2D submap corresponds to an image capture from an aircraft having the position as indicated by the second imaginary aircraft 14 shown with dashed lines. The position of the imaginary aircraft is essentially the same as the position of the satellite 11. There is a small difference in position between the aircraft 14 and the satellite to illustrate that it is possible to have slightly different positions resulting in the small difference between the first angle α and the second angle β, and the small difference in height between the first height h1 and the second height h2. A Machine Learning Network (MLN) is provided. The Machine Learning Algorithm is chosen from a Generative Adversarial Network (GAN), a Fully Connected Network (FCN) and a Convolutional Neural Network (CNN). GANs are known from the prior art such as from (Ian J. Goodfellow, Jean Pouget-Abadie, Mehdi Mirza, Bing Xu, David Warde-Farley, Sherjil Ozair, Aaron C. Courville, and Yoshua Bengio. Generative adversarial nets. In Advances in Neural Information Processing Systems 27: Annual Conference on Neural Information Processing Systems 2014, Dec. 8-13, 2014, Montreal, Quebec, Canada, pages 2672-2680, 2014.). Different variants of GANs exist, such as, e.g., Super Resolution GANs (SRGAN) Wasserstein GANs (WGAN), and Self-Attention GAN (SAGAN). With an MLN it is possible to enhance the resolution of an image. 9. The MLN comprises a generator and a discriminator. The generator generates, based on the 2D subimage, a synthetic image. The discriminator compares the synthetic image with the 2D subimage and makes a determination on whether the synthetic image is real or fake. The process is reiterated a large number of times in order to train the generator to produce images that fools the discriminator.

In order for the training to be meaningful and successful the first 2D satellite image must have been captured at a first angle to the ground which is approximately the same as a second angle to the ground at which the 2D submap has been captured. The first 2D satellite image may have been captured at an angle to the ground that differs from angle to the ground the 2D submap has been captured with as much as 1° to get a good result and even with as much as 5° to get a satisfactory result.

After the training of the generator is considered to be finished the generator may be used to generate synthetic 2D satellite images based on 2D test images, which in this embodiment are 2D satellite test images. In this so called testing step the MLN is used to generate, from the 2D satellite test images, using the trained MLN, a synthetic 2D satellite images, wherein the synthetic 2D satellite images have an enhanced resolution in relation to the 2D satellite test images. It is primarily the texture that is enhanced. In FIG. 1 the first satellite 10 and the second satellite 11 captures images from different angles. This makes it possible to generate a synthetic 3D map comprising coordinate data and texture information from the synthetic 2D satellite images. The synthetic 3D map has a higher resolution than the original 2D satellite test images. In FIG. 1 the test images are of the same area 2 as the training images. In a real application the test images would normally be images of different areas than the areas captured by the training image.

As an alternative a 3D map comprising geocoded 3D coordinate data may be generated from the 2D satellite images. The texture information in the synthetic 3D map may then be enhanced using the synthetic 2D satellite images.

Each one of the 2D satellite images is associated with navigation data and distance information. The synthetic 3D map comprising coordinate data and texture information is generated from the synthetic 2D satellite images, using the navigation data and the distance information. The generation of a 3D map from 2D images has been described in detail in WO2014/112911 and will not be described in detail in this application.

Figure 2:
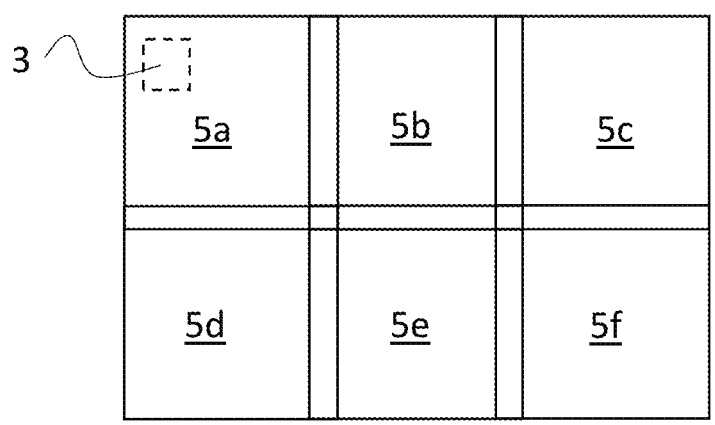
FIG. 2 shows schematically how a large area on the ground may be covered by a plurality of images.

FIG. 2 illustrates how a larger area may be covered by capturing test images of a plurality of, in this case six, different areas 2a-2f of the ground, which areas are slightly overlapping each other. This makes it possible to fit the captured images to each other. At least 2 satellite test images are captured of each area 2a-2f After training of the MLN a synthetic 2D satellite image is generated from each one of the 2D satellite images. A synthetic 3D map, covering the entire area 2a-2f, may then be generated from the synthetic 2D satellite images Also shown in FIG. 2 is a second area 3 of which an aerial image is captured from an aircraft 13, 14. The aerial image of the second area is used to train the MLN as explained above. As mentioned above the 2D satellite training image used to train the MLN are usually different from the 2D satellite test images used to create the synthetic 3D map.

The MLN preferably comprises a first multilayer perceptron constituting a generator, and a second multilayer perceptron constituting a discriminator.

Figure 3:
FIG. 3 illustrates a 3D map.

FIG. 3 illustrates a 3D map 9 comprising coordinate data and texture information on the lower right part 7 of the map and comprising only coordinate data on the upper left part 8 of the map. The coordinate data of the 3D map 9 may be generated either from the synthetic 2D satellite images or directly from the 2D satellite images. After generation of the coordinate data the 3D map 9 looks like the upper left part 8 of the 3D map 9. The texture information is then applied by using the information from the synthetic 2D images to create a 3D map 9 as is shown in the lower right part 7.

The above described method is preferably performed by a system for resolution enhancement of images. The system is preferably implemented on a server device and is arranged to perform the method as described above.

A computer program for resolution enhancement of images, comprising instructions which, when executed by at least one processor cause the at least one processor to carry out the method as described above may be stored on a computer-readable storage medium.

Figure 4:
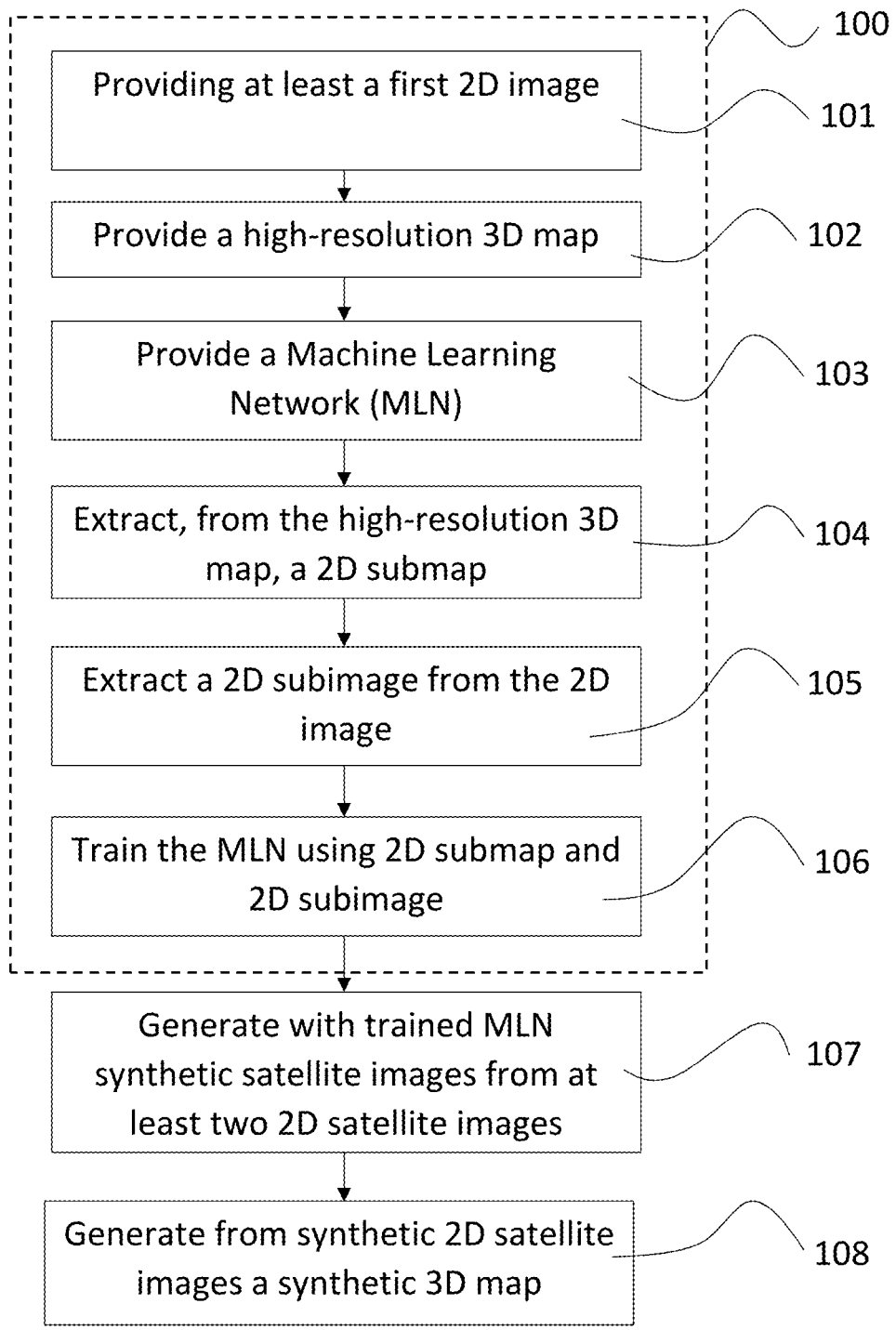
FIG. 4 illustrates a method according to the invention.

FIG. 4 shows schematically a method according to an embodiment of the invention. The first six steps 101-106 within the dashed frame 100 describe the basic method steps. The method thus comprises the first step of providing 101 at least a first two dimensional (2D) image comprising an image of a first area 2 on ground 1. The method is characterized in that the method further comprises the second step of providing 102 a high-resolution three dimensional (3D) map, wherein the high-resolution 3D map covers a second area (3) which at least is a part of the first area, and wherein the high-resolution 3D map has a higher resolution than the 2D image. The method also comprises the third step of providing 103 a Machine Learning Network (MLN), and the fourth step of extracting 104, from the high-resolution 3D map, a 2 dimensional (2D) submap, representing a third area which is at least a part of the second area, and comprising geocoded 2D coordinate data and texture information. The method also comprises the fifth step of extracting 105 a 2D subimage from the 2D image, which 2D subimage is an image of the third area, and the sixth step of training 106 the MLN, using the high-resolution 2D submap and the 2D subimage. These six steps are the basic steps of the method. Also shown in FIG. 4 is the additional step of generating 107, from at least two different 2D images, wherein each one of the 2D images comprises an image of the first area 2, wherein the 2D images are taken from at least two different angles towards the ground 1, and wherein synthetic 2D images are generated for each 2D image using the trained MLN. The synthetic 2D images have an enhanced resolution in relation to the 2D images. The method illustrated in FIG. 4 finally comprises the step of generating 108 from the synthetic 2D images a synthetic 3D map comprising coordinate data and texture information. The seventh step 107 and the eighth step 108 may be amended as has been described above.

The Machine Learning Algorithm is chosen from a Generative Adversarial Network (GAN), a Fully Connected Network (FCN) and a Convolutional Neural Network (CNN).

Figure 5:
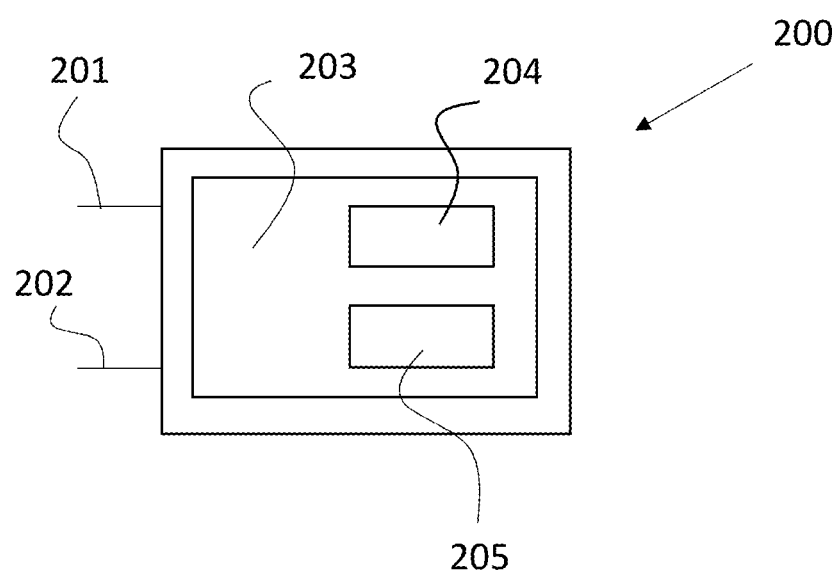
FIG. 5 shows a system for resolution enhancement of images.

FIG. 5 shows a system for resolution enhancement of images, which system is implemented on a server device 200. The server device comprises a first input 201 for a high-resolution 3D map and a second input 202 for images. The server device 200 also comprises a processor on which a computer program runs which makes the server device 200 to perform the method according to the invention. The processor runs a virtual generator 204 and a virtual discriminator 205 which perform the training of the MLN. After training the processor may generate the synthetic images as described above.

The invention is not limited to the above-described embodiments and many modifications are possible within the scope of the following claims. Indeed, a person of ordinary skill in the art would be able to use the information contained in the preceding text to modify various embodiments of the invention in ways that are not literally described, but are nevertheless encompassed by the attached claims, for they accomplish substantially the same functions to reach substantially the same results. Therefore, it is to be understood that the invention is not limited to the specific embodiments disclosed and that modifications and other embodiments are intended to be included within the scope of the appended claims. Although specific terms are employed herein, they are used in a generic and descriptive sense only and not for purposes of limitation.

In most practical applications the high-resolution 3D map is based on aerial images. It is, however, possible that the high-resolution 3D map is based on 2D images captured from high building or towers.

The invention claimed is:

1. A method for resolution enhancement of aerial images or satellite images, the method comprising the step of:
providing at least a first two-dimensional (2D) training image comprising an image of a first area on ground, wherein the 2D training image has been captured at a first angle towards the ground and at a first height above the ground;

providing a Machine Learning Network (MLN), providing a high-resolution three-dimensional (3D) map created based on aerial images captured from at least two different angles, wherein the high-resolution 3D map covers a second area which at least is a part of the first area, and wherein the high-resolution 3D map has a higher resolution than the 2D training image;

extracting, from the high-resolution 3D map in a second angle towards the ground and at a second height above the ground, a 2D submap, representing a third area which is at least a part of the second area and comprising geocoded 2D coordinate data and texture information, wherein the second angle differs no more than 5° from the first angle and wherein the second height differs no more than 5% from the first height;

extracting a 2D subimage from the 2D training image, which 2D subimage is an image of the third area; and training the MLN, using the high-resolution 2D submap and the 2D subimage.

2. The method according to claim 1, wherein the second angle differs no more than 1° from the first angle.

3. The method according to claim 1, wherein the second height differs no more than 1% from the first height.

4. The method according to claim 1, further comprising the steps of:

providing at least one 2D test image comprising an image of an area on ground, and generating, from the at least one 2D test image, using the trained MLN, a synthetic 2D image, wherein the synthetic 2D image has an enhanced resolution in relation to said at least one 2D test image.

5. The method according to claim 1, wherein:

at least two different 2D test images are provided, each one of the 2D test images comprises an image of the same area on ground, the 2D test images are taken from at least two different angles towards the ground, and a respective synthetic 2D image is generated from each one of the 2D test images using the trained MLN.

6. The method according to claim 1, wherein the high-resolution 3D map comprises geocoded 3D coordinate data and texture information.

7. The method according to claim 5, wherein:

each one of the 2D test images is associated with navigation data and distance information, and the method further comprises the step of generating from the synthetic 2D images, using the navigation data and the distance information, a synthetic 3D map comprising coordinate data and texture information.

8. The method according to claim 5, further comprising the steps of:

generating from the 2D test images a synthetic 3D map comprising geocoded 3D coordinate data, and enhancing, using the synthetic 2D images, the texture information in the synthetic 3D map.

9. The method according to claim 1, wherein the Machine Learning Network (MLN) is chosen from a Generative Adversarial Network (GAN), a Fully Connected Network (FCN) and a Convolutional Neural Network (CNN).

10. The method according to claim 1, wherein the Machine Learning Network (MLN) is a GAN comprising a first multilayer perceptron constituting a generator, and a second multilayer perceptron constituting a discriminator.

11. A system for resolution enhancement of images, the system being implemented on a server device and configured to perform the method according to claim 1.

12. A non-transitory computer-readable storage medium carrying a computer program for resolution enhancement of images according to the method of claim 1.

* * * * *